US008714068B2

(12) United States Patent
Ornelaz, Jr.

(10) Patent No.: US 8,714,068 B2

(45) Date of Patent: May 6, 2014

(54) TAILORED SLICING

(71) Applicant: Frito-Lay North America, Inc., Plano, TX (US)

(72) Inventor: Richard D. Ornelaz, Jr., Frisco, TX (US)

(73) Assignee: Frito-Lay North America, Inc., Plano, TX (US)

(*) Notice: Subject to any disclaimer, the term of this patent is extended or adjusted under 35 U.S.C. 154(b) by 99 days.

(21) Appl. No.: 13/630,502

(22) Filed: Sep. 28, 2012

(65) Prior Publication Data

US 2014/0090536 A1 Apr. 3, 2014

(51) Int. Cl.
*B62D 1/12* (2006.01)

(52) U.S. Cl.
USPC ............................ 83/403; 83/699.51; 83/932

(58) Field of Classification Search
USPC ........... 83/165, 403, 663, 856–858, 932, 591, 83/594–596, 592, 699.51, 703, 404.1, 83/404.3, 698.11
See application file for complete search history.

(56) References Cited

U.S. PATENT DOCUMENTS

| | | | | |
|---|---|---|---|---|
| 3,139,128 | A * | 6/1964 | Urschel et al. | 83/111 |
| 3,395,742 | A | 8/1968 | Sanders | |
| 4,590,835 | A * | 5/1986 | Matsuo | 83/698.41 |
| 5,095,875 | A * | 3/1992 | Morris et al. | 83/856 |
| 5,694,824 | A | 12/1997 | Jacko et al. | |
| 5,819,628 | A * | 10/1998 | Cogan et al. | 83/698.11 |
| 6,116,130 | A * | 9/2000 | Cogan | 83/403 |
| 6,968,765 | B2 * | 11/2005 | King | 83/403 |
| 8,161,856 | B2 | 4/2012 | Jacko et al. | |

* cited by examiner

*Primary Examiner* — Phong Nguyen

(74) *Attorney, Agent, or Firm* — Colin P. Cahoon; Shaukat Karjeker; Carstens & Cahoon, LLP

(57) ABSTRACT

A blade clamp for use in an automated, high speed potato slicing apparatus to slice chips to a predetermined size for packaging purposes. The blade clamp includes a cutting head; a blade mount having a slot therein; a first knife element between the cutting head and the blade mount, the first knife element having a first cutting edge; and optionally a second knife element having a second knife edge, the second knife element extending from the slot of the blade mount, such that the first and second cutting edges are substantially orthogonal to each other.

14 Claims, 5 Drawing Sheets

TAILORED SLICING

BACKGROUND OF THE INVENTION

1. Technical Field

The present technology relates to a potato slice cutting head and to a method of producing potato chips using a potato slice cutting head.

2. Description of Related Art

It is well known to employ a rotary cutting apparatus for cutting potatoes into fine slices for the manufacture of potato chips. A well-known cutting apparatus, which has been used for more than 50 years, comprises an annular-shaped cutting head and a central impeller assembly coaxially mounted for rotation within the cutting head to deliver food products, such as potatoes, radially outwardly toward the cutting head.

A series of knives is mounted annularly around the cutting head and the knife cutting edges extend substantially circumferentially but slightly radially inwardly towards the impeller assembly. Each knife blade is clamped to the cutting head to provide a gap, extending in a radial direction, between the cutting edge of the blade and the head. The gap defines the thickness of the potato slices formed by the cutter.

In the manufacture of potato chips, the potatoes are cut into slices and, after cooking, for example by frying, and seasoning potato chips are produced which then are packaged for the consumer.

One problem with current manufacturing methods and apparatus is that sometime a small proportion of the potato chips have a maximum width dimension that the potato chips can be difficult to package. Typically, a measured amount of the potato chips is filled into a package which comprises a flexible bag, of selected dimensions, for packaging a defined weight of the potato chips. The bag is filed by, for example, a known vertical form, fill and seal (VFFS) machine. During the filling step, the package has an upper opening presenting a maximum width dimension, most typically a diameter of the opening, through which the potato chips are filled downwardly into the bag under gravity.

If the potato chips are too large in dimension, it is difficulty to fill the bag reliably and at high speed. Intermittently, some of the potato chips may inadvertently become tapped in the upper seal of the bag, which compromises product quality. In some cases, up to about 0.5% of the packages can be wasted because of this phenomenon. In addition, consumers may purchase faulty packaged products, which may lead to undesired consumer complaints.

Furthermore, large potato slices can reduce the ability of a given weight of potato chips to pack together in a package. This can require the packaging line speed to be reduced, which increases the production costs and lowers the production efficiency. Additionally, the package volume needs to be enlarged to be able to accommodate the poor chip packing density.

In order to attempt to alleviate the problems of excessively large potato chips, it is known to use grade potatoes prior to processing in order to ensure that the potatoes are sufficiently small that these packaging problems are minimized. The grading may be manual or automated. However, the use of small potatoes reduces the productivity and efficiency of the potato chip manufacturing process. Also, the production line cost is increased.

Also, there is an increasing desire to use large potatoes to manufacture potato chips in order to increase the productivity and efficiency of the potato chip manufacturing process. Large potatoes are agronomically more productive with a higher yield per acre of crops. There are some potato varieties which are used to manufacture other potato products, such as French fries, but which cannot efficiently be used to manufacture potato chips using known potato chip manufacturing apparatus and processes because the potatoes are too large.

If potatoes are used which are too large for the cutting head to process, it is known to use a "grader halver" upstream of the potato slicer. The grader halver cuts the potatoes in half prior to slicing in order to reduce the slice dimensions. There are a number of problems with the use of potato halvers. First, the production line cost is increased. Second, the grader halvers are not very efficient and can reduce production speeds. Third, the presence of potato chips with straight edges in a package of potato chips is generally not acceptable to the consumer.

It is also known to use packaging machines with "chip breakers" which remove or break up excessively large potato chips immediately upstream of the packaging machine. However, this causes product waste and/or can also produce a large number of crumbs or small pieces which again are generally not acceptable to the consumer.

SUMMARY

An exemplary non-limiting embodiment of the present invention includes a blade clamp for use in a potato slicing apparatus. The blade clamp includes a cutting head; a blade mount slidingly engaged with the cutting head; and a first knife element located between the cutting head and the blade mount. The first knife element has a first cutting edge. Optionally, the blade clamp includes a second knife element having a second cutting edge. The optional second knife element extends through a slot in the blade mount, such that the first and second cutting edges are substantially orthogonal to each other.

Optionally, the cutting head, blade mount and first knife element of the exemplary embodiment are coplanar. Optionally, the cutting head may further comprise a nub to engage with a hole in the knife element to register the first cutting edge with the cutting head. Optionally, the cutting head may further include an elongate trough extending along a rear side thereof. Further, optionally, the blade clamp may include a rocking arm having a lever-handle, and an elongate portion configured to fit within the elongate trough of the cutting head. Optionally, the elongate portion of the rocking arm may be substantially cylindrical and may include a flat region extending at least partially along a length thereof, the flat region facing a surface of the blade mount, when the clamp is in use. Further optionally, motion of the lever-handle of the rocking arm may cause rotation of the elongate portion thereof in the trough thereby allowing sliding disengagement of the blade mount from the cutting head to allow removal and replacement of the first knife element between the cutting head and the blade mount, without removing the blade clamp from the slicing apparatus. Optionally, the blade mount may include a bull nose, the bull nose angled and having a leading edge, the leading edge abutting tightly against the first knife element, when the clamp is in use. Optionally, the bull nose of the blade mount may include a slot, and the second cutting edge may extend through the slot in the bull nose. Optionally, motion of the lever-handle of the rocking arm may cause rotation of the elongate portion thereof in the trough thereby allowing sliding disengagement of the blade mount from the cutting head to allow removal and replacement of either the first knife element or the second knife element, or both, without removing the blade clamp from the slicing apparatus. Optionally, the second knife element may include a handle portion, which extends rearward beyond a bull nose portion of the blade mount, such that the handle portion is clamped between the blade mount and the first knife element. Optionally, the exemplary blade clamp may include a fastener having one end affixed to the cutting head and a fastener head at another end thereof, which slidingly engages a slot of the blade mount, such that rotation of the rocking arm in a first direction locks the blade mount to the cutting head, and rotation in an opposite direction permits disengagement of the blade mount from the cutting head, without removing the blade clamp from the slicing apparatus.

In another exemplary embodiment, there is provided a blade clamp that has a cutting head with a longitudinally-extending trough along a rear portion thereof. The blade clamp includes a blade mount slidingly engaged with the cutting head; and a first knife element sandwiched between the cutting head and the blade mount. The first knife element has a first cutting edge. The clamp includes a rocking arm which has a lever-handle and an elongate substantially cylindrical portion. The elongate portion has a flat region along one side thereof and is sized and configured to fit within the trough of the cutting head such that the flat region faces an underside of the blade mount. Optionally, the cutting head of the exemplary blade clamp may include a nub to engage with a hole in the knife element to register the first cutting edge with the cutting head. Optionally, the blade mount may include an angled bull nose having a leading edge which abuts tightly against the first knife element, when the clamp is locked and in use. Optionally, the blade mount may further include a second knife element extending from a slot in the bull nose with a cutting edge oriented orthogonally to the cutting edge of the first knife element. Optionally, the blade mount comprises a slot to engage a fastener which extends through the blade mount into the cutting head. Further optionally, movement of the rocking arm in a first direction may lock the blade mount to the cutting head, and movement in an opposite diction may permit sliding disengagement of the blade mount from the cutting head thereby allowing access to remove and replace the first knife element, without removing the blade clamp from the slicing apparatus. In another option, movement of the rocking arm permits sliding disengagement of the blade mount from the cutting head allowing access to remove and replace the first knife element, or the second knife element, or both.

In a yet further exemplary embodiment, there is provided a blade clamp for use in a potato slicing apparatus that includes:

a cutting head, the cutting head having a longitudinally-extending trough along a rear portion thereof;

a blade mount having a bull nose portion that includes a laterally-extending slot therein, and the blade mount having a slot receiving a fastener, the fastener extending to the cutting head;

a first knife element sandwiched between the cutting head and the blade mount, the first knife element having a first cutting edge;

optionally, a second knife element having a second knife edge, the second knife element extending from the at least one slot of the blade mount, such that the first and second cutting edges are substantially orthogonal to each other, the second knife element including a handle portion, the handle portion extending rearward beyond the bull nose portion of the blade mount, the handle portion clamped between the blade mount and the first knife element; and a rocking arm, the rocking arm substantially L-shaped and having a lever-handle and an elongate substantially cylindrical portion, the elongate portion having a flat region along one side thereof, the elongate portion sized and configured to fit within the trough of the cutting head such that the flat region faces an underside of the blade mount;

wherein rotation of the rocking arm in a first direction clamps the blade mount to the cutting head and rotation of the rocking arm in an opposite direction permits removal of the first knife element and option second knife element, without removing the blade clamp from the slicing apparatus.

Further, other exemplary embodiments of the present invention provide apparatus for cutting potato slices, the apparatus comprising an annular-shaped cutting head and a central impeller coaxially mounted for rotation within the cutting head for delivering potatoes radially outwardly toward the cutting head, the impeller having a base with an upper surface across which potatoes are, in use, delivered to the cutting head, a plurality of knives serially mounted annularly around the cutting head, each knife having a first cutting edge extending substantially vertically and spaced from the cutting head to provide a gap, extending in a radial direction, between the first cutting edge and the cutting head, each knife also having a second cutting edge extending substantially horizontally and extending radially at least partly across the gap, the second cutting edge being located at least 50 mm above the upper surface of the impeller to define a cutting zone for cutting a single potato slice between the upper surface of the impeller and the second cutting edge.

Optionally, the second cutting edge is located from 60 mm to 90 mm above the upper surface of the impeller. Further optionally, the second cutting edge is located from 70 mm to 80 mm above the upper surface of the impeller.

Optionally, the second cutting edge is orthogonal to the first cutting edge.

Optionally, the second cutting edge is located rearwardly of the first cutting edge, typically by a distance of at least 1 mm, more typically from 4 mm to 10 mm, typically about 8 mm.

Optionally, in each knife the first and second cutting edges are formed on respective first and second knife elements.

Typically, the first knife element comprises an elongate substantially planar blade removably clamped to the cutting head by an elongate clamping member mounted adjacent to the first knife element.

Typically, the second knife element comprises a blade portion extending substantially orthogonally from a base portion, the base portion being removably clamped to the cutting head by the elongate clamping member.

Optionally, the base portion is removably clamped against the first knife element.

In some embodiments, the elongate clamping member includes a slot through which extends the blade portion of the second knife element.

Optionally, the slot is a closed slot located rearwardly of a leading edge of the elongate clamping member.

In some exemplary embodiments, the elongate clamping member includes at least two slots spaced apart in a longitudinal direction along the elongate clamping member, each slot being provided for mounting the second knife element at a respective predetermined distance from the upper surface of the impeller. Alternatively, in other embodiments there is a single slot in the clamping member.

Exemplary embodiments of the present invention further provide a method of producing potato slices for the manufacture of potato chips, the method comprising the steps of:

a. providing a plurality of potatoes;
b. feeding the potatoes to a cutting head adapted to cut the potatoes into slices, the cutting head having a plurality of knives;

c. delivering each potato to a respective knife in the cutting head, the knife having a first cutting edge adapted to cut the potato into slices and a second cutting edge adapted to cut any potato slice having a width greater than a predetermined dimension into two slice portions, the two slice portions comprising a first slice portion having a first maximum width corresponding to the predetermined dimension and a second slice portion having a second maximum width smaller than the first maximum width;
d. cutting each potato into a plurality of slices by the first cutting edge; and
e. cutting each slice having a width greater than the predetermined dimension into the first and second slice portions by the second cutting edge.

Optionally, in step b the potatoes fed to the cutting head are initially uncut.

Optionally, the predetermined dimension is at least 50 mm, further optionally from 60 mm to 90 mm, yet further optionally from 70 mm to 80 mm.

Typically, cutting steps d and e are carried out substantially simultaneously.

In general, cutting step e cuts the slice into only two slice portions.

Optionally, the plurality of potatoes provided in step a has a median potato diameter and the predetermined distance is greater than the median potato diameter so that at least 50%, further optionally at least 60%, of the slices produced after cutting steps d and e are uncut in step e.

Optionally, the cutting head is an annular-shaped cutting head and a central impeller is coaxially mounted for rotation within the cutting head for delivering potatoes radially outwardly toward the cutting head.

Optionally, the impeller has a base with an upper surface across which potatoes are, in use, delivered to the cutting head, and the knives are serially mounted annularly around the cutting head.

Optionally, each first cutting edge extends substantially vertically and is spaced from the cutting head to provide a gap, extending in a radial direction, between the first cutting edge and the cutting head, each second cutting edge extending substantially horizontally and extending radially at least partly across the gap.

Optionally, each second cutting edge is located at least 50 mm above the upper surface of the impeller to define a cutting zone for cutting a single potato slice between the upper surface of the impeller and the second cutting edge.

Exemplary embodiments of the present invention further provides a method of manufacturing potato chips, the method comprising the steps of:

f. providing a plurality of potato slices produced by an exemplary method of the invention;
g. cooking and seasoning the potato slices to produce flavored potato chips; and
h. filling a measured amount of the potato chips into a package, wherein during the filling step the package has an opening presenting a maximum width dimension, and the potato chips have a maximum width which is no more than 90% of the maximum width dimension of the opening.

Typically, the potato chips have a maximum width which is no more than 80% of the maximum width dimension of the opening.

Exemplary embodiments of the present invention further provide methods of manufacturing potato chips. An exemplary method includes the steps of:

a. providing a plurality of uncut potatoes which have been graded to provide a potato diameter distribution having a median potato diameter;
b. feeding the uncut potatoes to a cutting head adapted to cut the potatoes into slices;
c. in the cutting head cutting each potato into a plurality of slices; and
d. in the cutting head cutting each slice having a width greater than at least the median potato diameter into first and second slice portions so that at least 50% of the slices produced after cutting steps c and d are uncut in step d.

Typically, cutting steps c and d are carried out so that at least 60% of the slices produced after cutting steps c and d are uncut in step d.

Optionally, in cutting step d each slice having a width greater than 70 mm, or 60 mm, or 50 mm, is cut into first and second slice portions.

Optionally, cutting steps c and d are carried out substantially simultaneously.

Optionally, cutting step d cuts the slice into only two slice portions.

Optionally, the cutting head is an annular-shaped cutting head and a central impeller is coaxially mounted for rotation within the cutting head for delivering potatoes radially outwardly toward the cutting head.

Optionally, the impeller has a base with an upper surface across which potatoes are, in use, delivered to the cutting head.

Optionally, the cutting head has a plurality of knives serially mounted annularly around the cutting head, each knife having a first cutting edge cutting the slices in step c and a second cutting edge cutting the slices in step d.

Optionally, each first cutting edge extends substantially vertically and is spaced from the cutting head to provide a gap, extending in a radial direction, between the first cutting edge and the cutting head, each second cutting edge extending substantially horizontally and extending radially at least partly across the gap.

Optionally, wherein each second cutting edge is located at least 50 mm above the upper surface of the impeller to define a cutting zone for cutting a single potato slice between the upper surface of the impeller and the second cutting edge.

Typically, the method further comprises the step of:

e. cooking and seasoning the potato slices from cutting steps c and d to produce flavored potato chips; and
f. filling a measured amount of the potato chips into a package, wherein during the filling step the package has an opening presenting a maximum width dimension, and the potato chips have a maximum width which is no more than 90% of the maximum width dimension of the opening.

Optionally, the potato chips have a maximum width which is no more than 80% of the maximum width dimension of the opening.

The exemplary embodiments of the present invention provide a number of technical and commercial advantages and benefits over the known methods and apparatus for manufacturing potato slices and potato chips made therefrom.

First, the potato chips have a controlled maximum width dimension so that the potato chips are easier to package, particularly into flexible bags by use of a known vertical form, fill and seal (VFFS) machine. The bag can be filled reliably and at high speed. Packaging waste and consumer complaints can be reduced.

The packaging line speed can be high, which reduces the production costs and increases the production efficiency.

There is very little additional capital cost or running cost by the introduction of the modified twin blade assembly used in the exemplary embodiments of the present invention.

Additionally, the package volume can be reduced for a given weight of product because of the increased chip packing density.

Furthermore, the upstream grading of potatoes prior to processing can be reduced or eliminated. There is no need to use grader halvers. The production line capital and running costs can be reduced.

Also, large potatoes can be used to manufacture potato chips in order to increase the productivity and efficiency of the potato chip manufacturing process. Some potato varieties which have not hitherto been used commercially in large volumes to manufacture potato chips efficiently can now be used to manufacture potato chips.

By controlling the dimensional location of the second cutting edge relative to the dimensions of the incoming potato population to be processed, an effective and efficient apparatus and process are provided which allow large potatoes to be used while minimizing the proportion of potato chips with straight edges in a package of potato chips. Also, "chip breakers" can be avoided, and product waste and/or excessive crumbs or small pieces can be minimized.

BRIEF DESCRIPTION OF THE DRAWINGS

Exemplary embodiments of the present invention will now be described, by way of example only, with reference to the accompanying drawings, in which.

DETAILED DESCRIPTION

Figure 1:
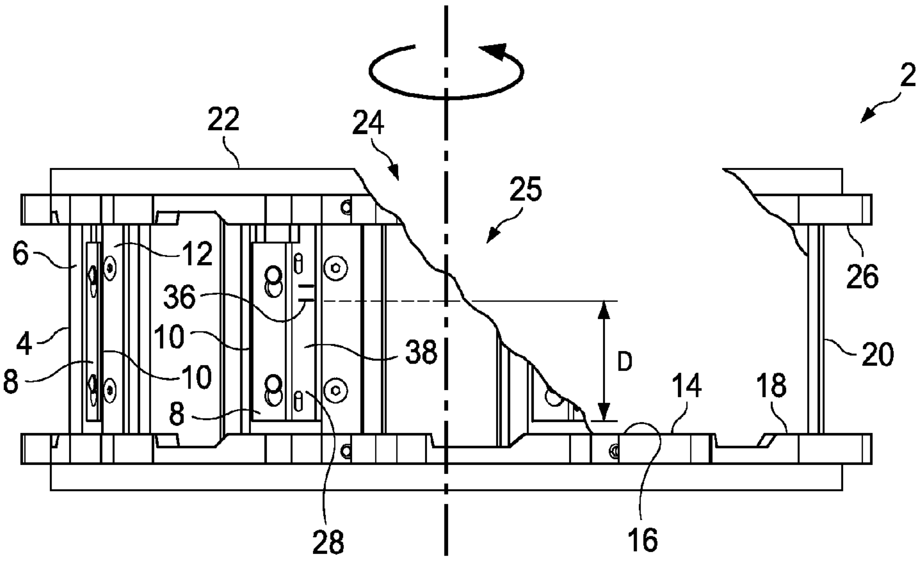
FIG. 1 is a schematic side view of a cutting head of a potato slice cutting apparatus in accordance with an exemplary embodiment of the present invention.
Figure 2:
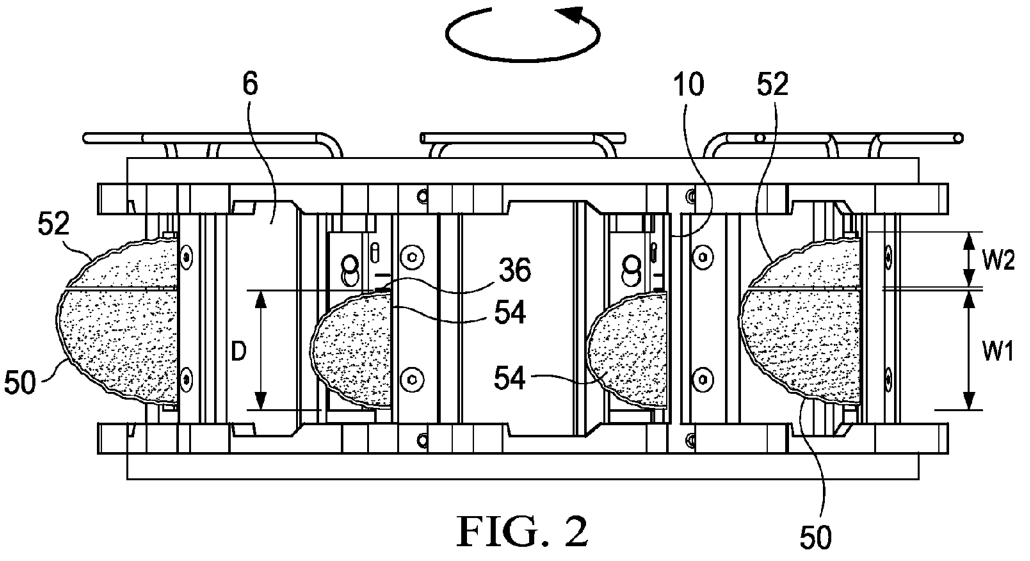
FIG. 2 is a schematic side view of the cutting head of FIG. 1 when used to cut potato slices showing the cutting operation on two differently sized potatoes.
Figure 4:
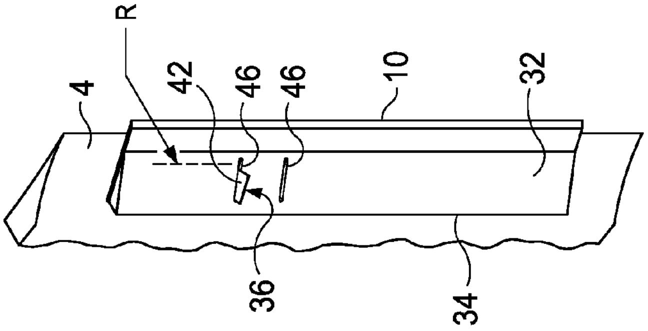
FIG. 4 is a schematic perspective view of the knife assembly in the cutting head of FIG. 1.
Figure 3:
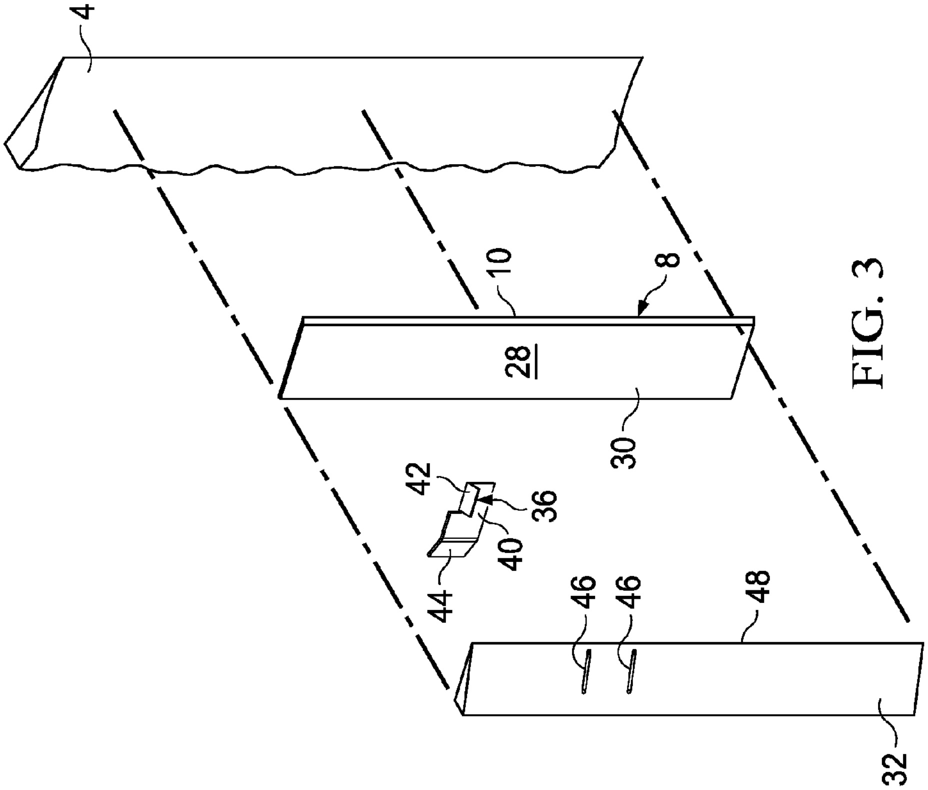
FIG. 3 is an exploded schematic perspective view of a knife assembly in the cutting head of FIG. 1.
Figure 7:
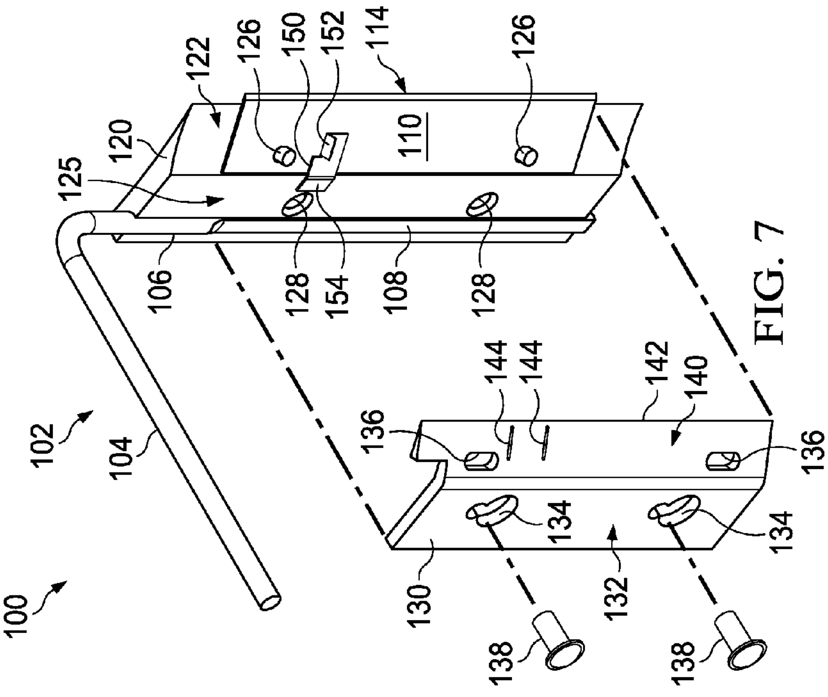
FIG. 7 is a schematic perspective view of a partially assembled view of the exemplary blade clamp of FIG. 6.

Referring to FIGS. 1 to 4, an exemplary potato slice cutting apparatus 2 in accordance with an exemplary embodiment of the present invention comprises an annular-shaped cutting head 4. The cutting head 4 includes a cylindrical wall 6 in which a plurality of knives 8 are serially mounted annularly around the cutting head 4. The knife cutting edges 10 extend substantially circumferentially but slightly radially inwardly. Each knife 8 has a first cutting edge 10 extending substantially vertically. The knife first cutting edges 10 extend substantially circumferentially but slightly radially inwardly. Each knife first cutting edge 10 is spaced from the cutting head 4 to provide a respective gap 12, extending in a substantially radial direction, between the first cutting edge 10 and the cutting head 4. The gap 12 defines a slice thickness to be cut by the potato chip cutting apparatus 2.

A central impeller 14 is coaxially mounted for rotation within the cutting head 4 for delivering potatoes radially outwardly toward the cutting head 4. The impeller 14 has a base 16 with an upper surface 18 across which potatoes are, in use, delivered to the cutting head 4. The base 16 is spaced from the lower edge 20 of the cylindrical wall 6. A cover 22 having a potato supply opening 24 is fitted to the upper edge 26 of the cylindrical wall 6. The cylindrical wall 6, base 16 and cover 22 define a central cavity 25.

The first cutting edge 10 is formed on a first knife element 28. The first knife element 28 comprises an elongate substantially planar blade element 30 removably and adjustably clamped to the cutting head 4 (also known as a "blade holder") by an elongate clamping member 32 of a blade mount 34 (also known as a "blade clamp") adjacent to the first knife element 28. The exposed first cutting edge 10 points substantially circumferentially but is oriented radially inwardly, as is known in the potato chip cutter art. The width of the gap 12 can be varied by moving the first knife element 28 in the blade mount 34.

Each knife 8 also has a second cutting edge 36 extending substantially horizontally and extending radially at least partly across the gap 12. The second cutting edge 36 is located a predetermined distance D which is at least 50 mm above the upper surface 18 of the impeller 14 to define a cutting zone 38 for cutting a single potato slice between the upper surface 18 of the impeller 14 and the second cutting edge 36.

Optionally, the second cutting edge 36 is located from 60 mm to 90 mm, typically from 70 mm to 80 mm, above the upper surface 18 of the impeller 14.

In the exemplary embodiment, the second cutting edge 36 is orthogonal to the first cutting edge 10; for example the first cutting edge 10 is vertically oriented and the second cutting edge 36 is oriented horizontally. The second cutting edge 36 may be located rearwardly of the first cutting edge 10, typically by a distance R of at least 1 mm, optionally from 4 mm to 10 mm, typically about 8 mm. The second cutting edge 36 may extend parallel to the first cutting edge 10 or be inclined so as to extend rearwardly from second cutting edge 36.

The second cutting edge 36 is formed on a respective second knife element 40. The second knife element 40 comprises a blade portion 42 extending substantially orthogonally from a base portion 44. The base portion 44 is adjustably and removably clamped to the cutting head 4 by the elongate clamping member 32. In particular, the base portion 44 is removably clamped against the first knife element 28. The blade portion 42 of the second knife element 40 may be orthogonal to the first knife element 28; for example the first knife element 28 is vertically oriented and the blade portion 42 of the second knife element 40 is oriented horizontally.

The elongate clamping member 32 includes a slot 46 through which extends the blade portion 42 of the second knife element 40. The slot 46 is a closed slot located rearwardly of a leading edge 48 of the elongate clamping member 32. In a particular embodiment, as illustrated, the elongate clamping member 32 includes at least two slots 46 spaced apart in a longitudinal direction along the elongate clamping member 32, each slot 46 being provided for mounting the second knife element 40 at a respective predetermined distance D from the upper surface 18 of the impeller 14. Alternatively, in other embodiments there is a single slot 46 in the clamping member 32 for mounting the blade portion 42 at a respective longitudinal position along the length of the clamping member 32.

In the illustrated exemplary embodiment, the knife 8 comprises a multiple knife assembly, with the first knife element 28 and the second knife element 40 being independent and separable. When two separable knife elements 28, 40 are provided in each knife 8, the individual knife elements 28, 40 can be independently replaced when the respective blade become worn. Also, as disclosed above, the second knife element 40 can be selectively moved relative to the first knife element 28, in particular in the longitudinal direction of the first knife element 28, in order to vary the distance D without moving the first knife element 28.

In an alternative exemplary embodiment, the knife comprises a single knife assembly element, with the first knife element 28 and the second knife element 40 being bonded together, for example by welding, or unitary and integral.

Typically, the first knife element 28 and the second knife element 40 are composed of stainless steel.

In use, whole potatoes, typically previously uncut, to be sliced by the potato chip cutting apparatus 2 for the manufacture of potato chips are supplied into the central cavity 24. The potatoes are urged radially outwardly by the impeller 14 under the action of a centrifugal force and are individually retained against the inner cylindrical surface of the impeller 14. The radially outward surface of the potato is cut by the first cutting edge 10 of the knives 8 which rotate, together with the impeller 14 holding the potatoes, within the cylindrical wall 6 of the cutting head 4. This motion causes individual slices 54 sequentially to be cut from the potato by the serially mounted knives 8. Each slice 54 passes radially outwardly through the predetermined gap 12 between the first cutting edge 10 and the cutting head 4. The slices 54 fly radially outwardly from the cutting head 4 and are collected in known manner for subsequent processing, for example frying and seasoning to form potato chips.

The second cutting edge 36 longitudinally cuts any potato slice 54 having a width greater than the predetermined distance D into two slice portions 50, 52. The two slice portions 50, 52 comprise a first slice portion 50 having a first maximum width W1 corresponding to the predetermined distance D and a second slice portion 52 having a second maximum width W2 smaller than the first maximum width W1. Since only one second cutting edge 36 is provided in each knife 8, each slice 54 having a width greater than the predetermined distance D is cut into only two slice portions 50, 52.

The cutting into slices 54 by the first cutting edge 10 and the cutting of the slices 54 into two slice portions 50, 52 by the second cutting edge 36 are carried out substantially simultaneously.

Figure 5:
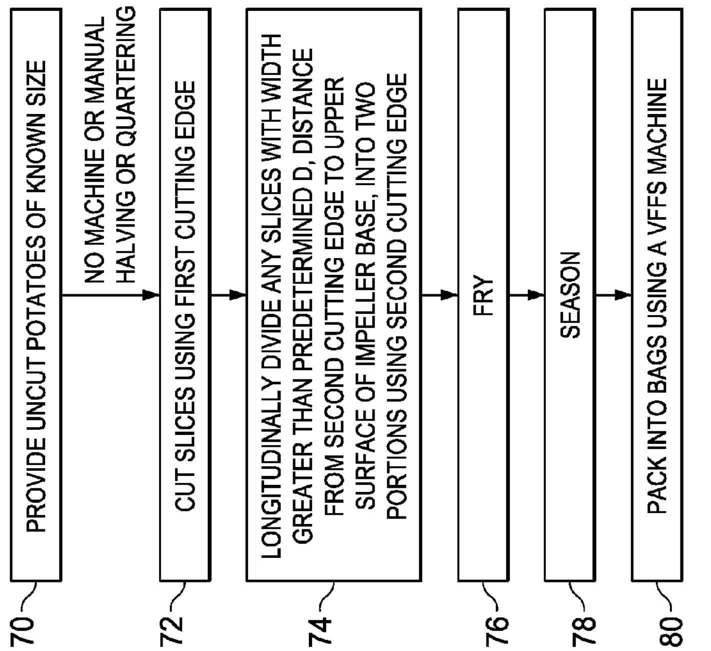
FIG. 5 is a schematic process flow chart which illustrates sequential steps during manufacture of potato chips in accordance with an exemplary embodiment of the present invention.

Referring to FIG. 5, in an exemplary embodiment of a method according to the invention a plurality of uncut potatoes is provided in step 70 which have been graded to provide a potato diameter distribution having a given median potato diameter. There is no machine or manual halving or quartering of the whole potatoes. The uncut potatoes are fed to the cutting head adapted to cut the potatoes into slices in step 72. In the cutting head, each potato is cut into a plurality of slices. Only those slices having a width greater than at least the median potato diameter are additionally cut longitudinally into first and second slice portions 50, 52, as shown by step 74. After the cutting head slicing and cutting operations in steps 72 and 74, the potato slices are then fried in step 76, seasoned in step 78 and packaged into bags using a VFFS machine in step 80.

In the exemplary embodiment method, the predetermined distance D is dependent upon the dimensions of the specific population or batch of potatoes to be cut in the particular cutting operation. The aim is to set the predetermined distance D so that large potatoes can be processed by the potato chip cutting apparatus 2 to form potato slices, yet the resultant slices have a size distribution which (a) minimizes packaging losses while additionally (b) maximizing the number and proportion of slices which have been cut to form straight edges, by the cutting action of the second cutting edge 36, and (b) minimizes the number and proportion of small dimension slices. Potato chips with straight edges and an excessive number and proportion of small dimension potato chips in a package of potato chips is generally not acceptable to the consumer.

Typically, to meet this aim the plurality of potatoes initially provided for processing to form potato slices and then potato chips has a median potato diameter, and the predetermined distance D is greater than the median potato diameter. This technical relationship between the dimensions of the particular potatoes to be cut and the set-up of the potato chip cutting apparatus 2 can provide that at least 50% of the slices produced after the cutting steps of the first and second cutting edges 10, 36 are uncut. In an exemplary embodiment, the predetermined distance D is greater than the median potato diameter so that at least 60% of the slices produced after these cutting steps are uncut.

In an exemplary embodiment of a method of manufacturing potato chips of the invention, after the plurality of potato slices has been cut, the potato slices are cooked and seasoned to produce flavored potato chips. Thereafter, a measured amount of the potato chips is filled into a package. Typically, the package comprises a flexible bag, of selected dimensions, for packaging a defined weight of the potato chips. The bag is filed by, for example, a known vertical form, fill and seal (VFFS) machine. During the filling step, the package has an upper opening presenting a maximum width dimension, through which the potato chips are filled downwardly into the bag under gravity. In an exemplary embodiment of the invention, the potato chips have a maximum width which is no more than 90% of the maximum width dimension of the opening. Typically, the potato chips have a maximum width which is no more than 80% of the maximum width dimension of the opening.

In an exemplary embodiment of the invention, and referring again to FIG. 5, a plurality of uncut potatoes is provided in step 70 which have been graded to provide a potato diameter distribution having a median potato diameter. There is no machine or manual halving or quartering of the whole potatoes. The uncut potatoes are fed to the cutting head adapted to cut the potatoes into slices in step 72. In the cutting head, each potato is cut into a plurality of slices. The cutting in the cutting head is carried out so that at least 50%, more particularly in some exemplary embodiments at least 60%, of the slices produced after the cutting steps, are uncut. Such a slice population is provided by setting the predetermined distance D so that only those slices having a width greater than at least the median potato diameter are additionally cut longitudinally into first and second slice portions 50, 52, as shown by step 74.

In one exemplary embodiment, each slice having a width greater than 70 mm is cut into first and second slice portions. In another exemplary embodiment, each slice having a width greater than 60 mm is cut into first and second slice portions. In a further exemplary embodiment, each slice having a width greater than 50 mm is cut into first and second slice portions. The selection of the particular predetermined distance D, for example in the embodiments above D being set at 70 mm, 60 mm or 50 mm, is typically dependent on a dimensional analysis of the potato supply to be sliced, and typically the potato supply has been pre-graded to give a particular dimensional range.

Again, the aim is to provide sufficient longitudinal division of excessively large slices to minimize packaging waste while minimizing the production of longitudinally cut or excessively small slices by setting the predetermined distance D based upon the dimensional analysis of the potato supply. This setting can be achieved on a trial and error basis following an initial short run of a small population size representative of the larger population in a typical batch for commercial processing on a potato chip production line.

In the exemplary embodiments, a particular cutting head is disclosed. However, the present technology can be utilized with a wide variety of different cutting head shapes and dimensions.

In addition, in the illustrated exemplary embodiment of the invention, the cutting head is stationary and the impeller rotates within the stationary cutting head. In alternative embodiments of the invention, the cutting head also rotates, and the impeller rotates within the rotating cutting head, with the cutting head and impeller either rotating in the same rotational direction but at different rotational speeds or rotating in opposite rotational directions.

Furthermore, the present technology can be utilized with various blade shapes and configuration, and accordingly the cutting head can be used with linear planar blades, such as for manufacturing conventional potato chips, or profiled blades, such as for manufacturing crinkle cut or other three dimensionally-shaped potato chips.

The cutting head of the exemplary embodiments of the invention may be of the two ring or single ring type.

Another exemplary embodiment of the blade clamp includes a "quick release" feature that allows removal of the knife element from the blade clamp with a minimum of labor and with less equipment downtime than before. In this exemplary embodiment, the quick release feature includes two mechanical steps: a release of the pressure of the blade mount on the knife element (which is aligned with the cutting head and blade mount) and the cutting head; and a sliding removal of the blade mount from its engagement with the cutting head. Thus, the knife element can be removed and replaced. After replacement, the blade mount is again slid into engagement with the cutting head and pressure between blade mount, knife element and cutting head is again applied mechanically. In a further example of an embodiment using the quick release feature, a first knife element is aligned with the cutting head and a second knife element is mounted in the blade clamp, orthogonally to the first knife element. In this exemplary embodiment, the same quick release features allow the removal of either or both of the knife elements of the blade clamp. An exemplary embodiment with a quick release feature may be used with a blade clamp having a plurality of knife blades.

Figure 6:
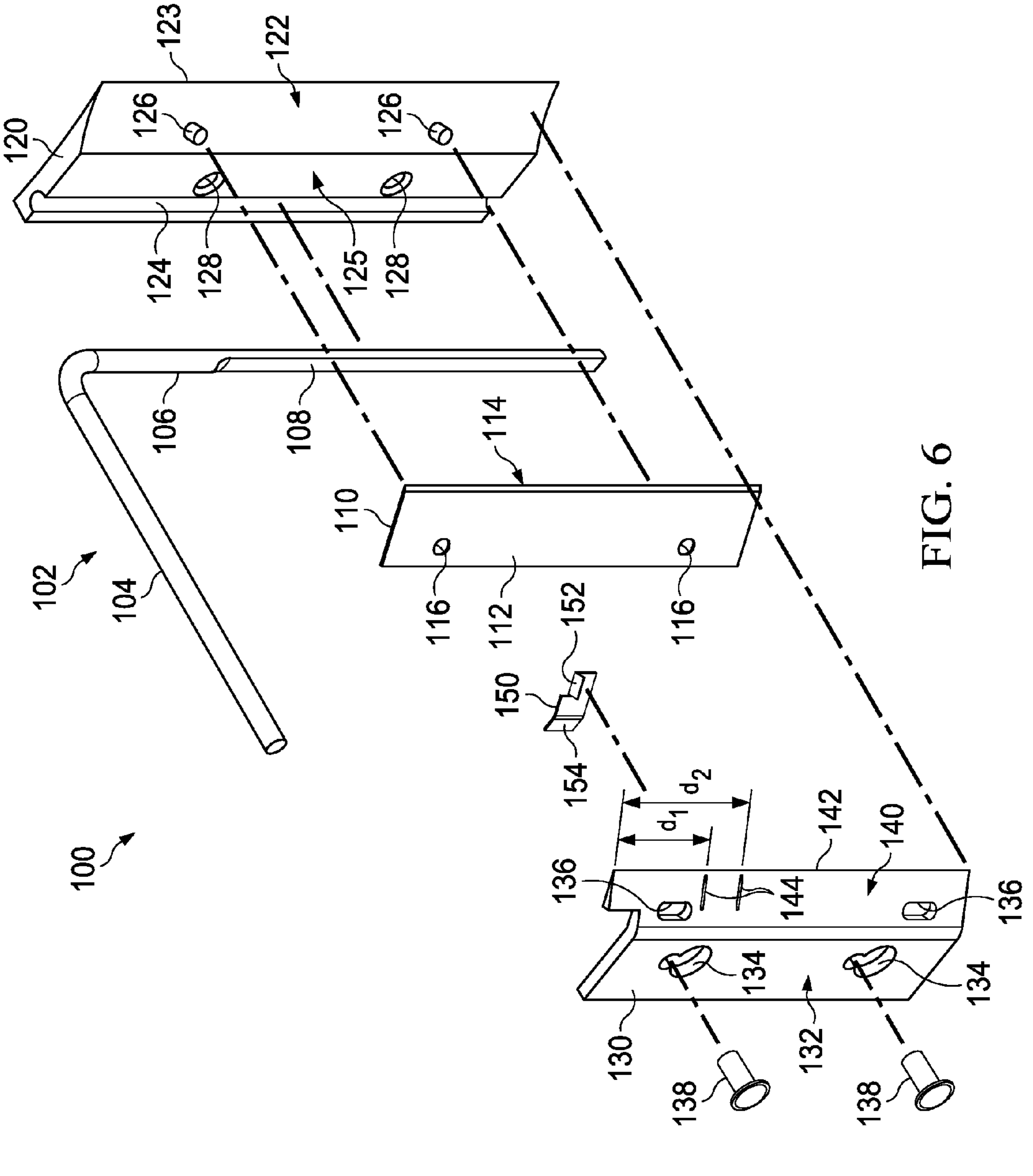
FIG. 6 is an exploded view of a blade clamp according to an exemplary embodiment of the present invention.

An exemplary embodiment of a blade clamp 100 having a quick release feature is shown in FIGS. 6-9. Referring primarily to FIG. 6, in this embodiment, the blade clamp 100 includes a cutting head 120 that has a body 125. The cutting head body 125 includes a front portion 122 that angles from a thicker central region of body 125 to a thin leading edge 123. A trough 124 extends along the length of the rear portion of body 125. The trough 124 is configured by size and shape to receive therein the elongate portion 106 of a lever-handle 102. When assembling the blade clamp 100, the elongate portion 106 is received in the trough in an orientation such that the flat region 108 faces out of the trough. As explained later, movement of the lever-handle 102 and sliding disengagement of the blade mount 130 from the cutting head 120 permits ready removal and replacement of either one or both blades in the blade clamp without need to disassemble it from the slicing apparatus. This is a significant time saving feature that reduces equipment downtime and labor costs. A first knife element 110 has a body 112 with a cutting edge 114 extending along the length of one side. In addition, the first knife element has holes, in this example a pair of through holes 116, that are spaced and sized to register with nubs 126 of cutting head 120. This allows precise placement ("registration") of the cutting edge 114 relative to the leading edge 123 of cutting head 120.

The exemplary embodiment includes a blade mount 130 that has a planar region 132 and an angled bull nose 140 along the length of one side. The bull nose has a leading edge 142 that is angled and configured to fit tightly against the upper surface of the first knife element 110, when assembled. Thus, the tight fit precludes materials from potatoes or other materials being cut from entering any space between the blade mount 130 and the first knife element 110. Moreover, to facilitate aligning the blade mount 130 with the cutting head 120 and the first cutting knife 110, the bull nose 140 has a pair of spaced apart through holes, exemplified by slots 136 that are sized to receive nubs 126 of the cutting head 120. Using the exemplary slots 136 rather than circular through holes permits some adjustment during assembly. The bull nose 140 also includes through holes, depicted as slots 144 that are sized and shaped to receive a second knife element 150. Only one slot is necessary, but several slots 144 may be provided at predetermined distances $d_1$, $d_2$, etc., based on the maximum size to which are any chip is to be limited, along the bull nose 140, or the purpose of the slicing. Thus multiple slots 144 may be used, each having a cutting blade therein, as needed. Or, only one of the multiple slots may be used, with selection depending upon the maximum size of slices desired. This second knife element 150 has a cutting edge 152 that is orthogonal to a handle portion 154. When assembled, the handle portion fits under the blade mount 130 and extends rearward to beyond the bull nose into the space beneath the planar region 132. As a result, the handle portion 154 is in a stressed condition and is tightly held in position. This contributes to the stability of the orientation of the cutting edge 152 of the second knife element within slot 144 as it is impacted by potatoes that it is cutting. This is particularly useful when a more ductile, springy steel, such as SS 11R51 for example, is used for the second knife element.

Figure 8:
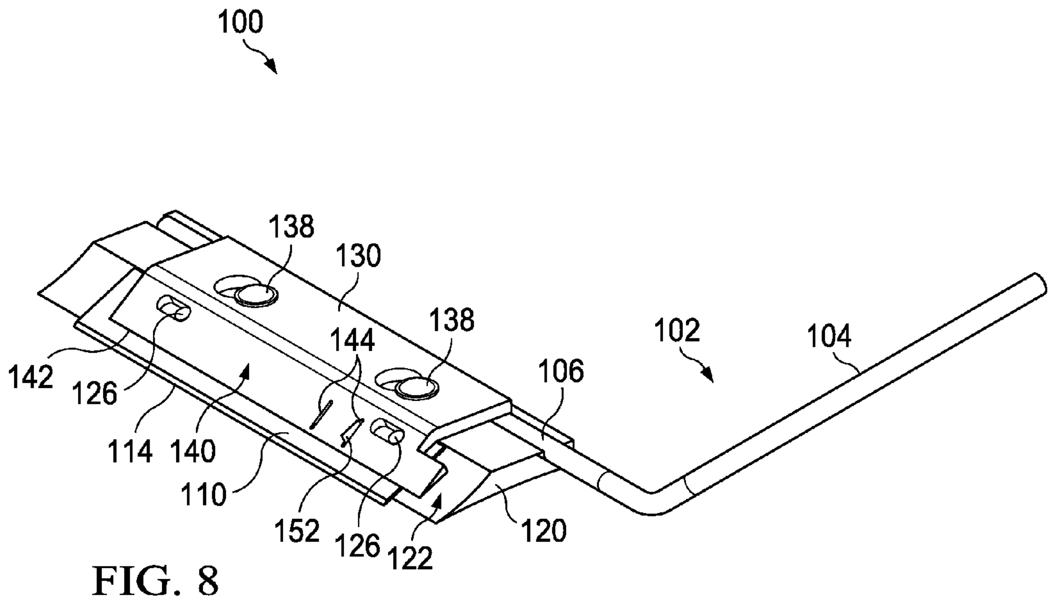
FIG. 8 is a schematic perspective view of the assembled exemplary blade clamp of FIG. 6, with lever-handle rotated to lock the blade clamp assembly together.
Figure 9:
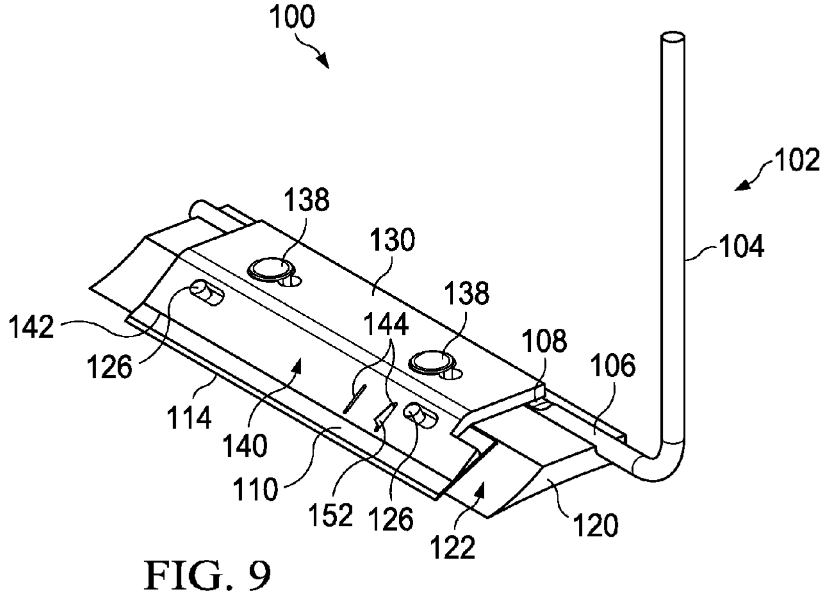
FIG. 9 is a schematic perspective view of the assembled exemplary blade clamp of FIG. 6, showing the lever-handle rotated to allow disengagement of the blade mount from the cutting head to permit knife replacement.

The planar region 132 of the blade mount 130 also includes a pair of through holes 134 that receive fasteners 138 that extend to through holes 128 in cutting head 120. In the illustrated example, the fasteners 138 are posts that have heads wider than their shanks so that the underside of the heads will engage the upper surface surrounding through holes 134 to press the blade mount 130 toward the cutting head 120. In an exemplary embodiment, these fasteners 138 are affixed at their distal ends into the through holes 128 while their shanks extend from the cutting head for a predetermined height such that the heads of the fasteners may enter through holes 134 and slidingly engage in these holes 134. In such engaged position, there is slight pressure holding the blade mount to the cutting head. This sliding engagement feature facilitates assembly of the blade clamp 100, without the need for tools, such as screw drivers, wrenches, and the like. The assembly is then locked by moving the rocking arm to the locked position, as shown in FIG. 8, for example. Moreover, sliding disengagement of the blade mount from the cutting head after rotating the rocking arm to the unlocked position, as shown in FIG. 9, for example, permits access to both the first and second knife elements 110, 150 so that they can be replaced, without having to remove the blade clamp 100 from the cylindrical cutting head. Thus, regardless of number of blades or orientation of the blades, the exemplary embodiment that includes the quick-release feature that permits blade removal and replacement by slidingly disengaging the blade mount 130 from the cutting head provides significant advantage in terms of saving time and effort in blade replacement. While the use of posts or shoulder bolts as the fasteners provides advantages, in other embodiments threaded bolts may be used to attach the blade mount to the cutting head.

Referring more particularly now to FIGS. 8 and 9, these depict the position of the rocking arm 102: (1) when the clamp is in use, and (2) when it is urging the clamp open to remove a first knife element. Referring to FIG. 6, in this embodiment, the flat region 108 of the lever-handle 102 is shown on the inside of the L-shape. Now, referring again to FIG. 8, when rocking arm 102 is more closely aligned with the plane of the blade clamp 100, the blade clamp 100 can be fitted into the cylindrical cutting apparatus for use. In that aligned rocking arm position, the flat region of the blade clamp may be rotated into the trough 124, and a cylindrical side of the elongate portion 106 urges the rear of the blade mount 130 upward. Because the fasteners provide a pivot point, the leading edge 144 of the blade mount presses down firmly and tightly on the first knife element to hold it in place during the rigors of use in the cutting apparatus.

In FIG. 9, when the rocking arm 102 is moved to a more vertical position, the flat region 108 is rotated from the trough to face the blade mount 130, thereby relieving the upward forces at the rear of the blade mount 130 and easing the pressure at the leading edge 144 on the first knife element 110. This allows removal of the any of the knife elements and replacement, without having to disassemble the blade clamp from the slicing assembly. This saves time and labor costs, and reduces the downtime of equipment thereby potentially increasing production, when slicing machine throughput is a limitation.

The present technology will now be illustrated further with reference to the following non-limiting Example.

EXAMPLE

A potato slice cutting apparatus having the structure of FIGS. 1 to 4 was employed to cut potato slices for the manufacture of potato chips. The slices were employed to produce potato chips according to the process flow chart of FIG. 5.

The dimension D was set at 70 mm. This dimension provided that, for the incoming potato stock, at least about 60% of the resultant potato chips were "uncut" in that they had no straight cut edges around their periphery and had not been cut longitudinally by the second cutting edge, but instead had been passed beneath the second cutting edge. The potato chips were packaged into 25-gram bags using a conventional VFFS machine.

Over a significant production period the packaging waste, caused by potato chips corrupting the upper seal of the bag, was measured. The packaging waste was found to be reduced by at least about 0.5% as compared to two parallel potato chip production lines which had the same incoming potato stock and the same production and packaging machines except that the blades of the potato slice cutting head were conventional linear blades and no second cutting edge was provided.

For a large potato chip manufacturing oration, this 0.5% saving in packaging waste corresponds to millions of dollars in annual savings in production costs.

Other modifications to the potato slice cutting device of the exemplary embodiments of the present invention will be readily apparent to those skilled in the art.

Other modifications to the potato slice cutting device of the exemplary embodiments of the present invention will be readily apparent to those skilled in the art.

Additional Disclosure

The following clauses are presented as a further description of the disclosed technologies and inventions herein.

1. An apparatus for cutting potato slices, the apparatus comprising an annular-shaped cutting head and a central impeller coaxially mounted for rotation within the cutting head for delivering potatoes radially outwardly toward the cutting head, the impeller having a base with an upper surface across which potatoes are, in use, delivered to the cutting head, a plurality of knives serially mounted annularly around the cutting head, each knife having a first cutting edge extending substantially vertically and spaced from the cutting head to provide a gap, extending in a radial direction, between the first cutting edge and the cutting head, each knife also having a second cutting edge extending substantially horizontally and extending radially at least partly across the gap, the second cutting edge being located at least 50 mm above the upper surface of the impeller to define a cutting zone for cutting a single potato slice between the upper surface of the impeller and the second cutting edge.
2. The apparatus according to clause 1 wherein the second cutting edge is located from 60 mm to 90 mm above the upper surface of the impeller.
3. The apparatus according to any preceding clause wherein the second cutting edge is located from 70 mm to 80 mm above the upper surface of the impeller.
4. The apparatus according to any preceding clause wherein the second cutting edge is orthogonal to the first cutting edge.
5. The apparatus according to any foregoing clause wherein the second cutting edge is located rearwardly of the first cutting edge.
6. The apparatus according to clause 5 wherein the second cutting edge is located rearwardly of the first cutting edge by a distance of at least 1 mm, optionally from 4 mm to 10 mm.
7. The apparatus according to any foregoing clause wherein in each knife the first and second cutting edges are formed on respective first and second knife elements.
8. The apparatus according to clause 7 wherein the first knife element comprises an elongate substantially planar blade removably clamped to the cutting head by an elongate clamping member mounted adjacent to the first knife element.
9. The apparatus according to clause 8 wherein the second knife element comprises a blade portion extending substantially orthogonally from a base portion, the base portion being removably clamped to the cutting head by the elongate clamping member.
10. The apparatus according to clause 9 wherein the base portion is removably clamped against the first knife element.

11. The apparatus according to clause 9 or 10 wherein the elongate clamping member includes a slot through which extends the blade portion of the second knife element.
12. The apparatus according to clause 11 wherein the slot is a closed slot located rearwardly of a leading edge of the elongate clamping member.
13. The apparatus according to clause 11 or 12 wherein the elongate clamping member includes at least two slots spaced apart in a longitudinal direction along the elongate clamping member, each slot being provided for mounting the second knife element at a respective predetermined distance from the upper surface of the impeller.
14. A method of producing potato slices for the manufacture of potato chips, the method comprising the steps of:
  a. providing a plurality of potatoes;
  b. feeding the potatoes to a cutting head adapted to cut the potatoes into slices, the cutting head having a plurality of knives;
  c. delivering each potato to a respective knife in the cutting head, the knife having a first cutting edge adapted to cut the potato into slices and a second cutting edge adapted to cut any potato slice having a width greater than a predetermined dimension into two slice portions, the two slice portions comprising a first slice portion having a first maximum width corresponding to the predetermined dimension and a second slice portion having a second maximum width smaller than the first maximum width;
  d. cutting each potato into a plurality of slices by the first cutting edge; and
  e. cutting each slice having a width greater than the predetermined dimension into the first and second slice portions by the second cutting edge.
15. The method according to clause 14 wherein in step b the potatoes fed to the cutting head are initially uncut.
16. The method according to clause 14 or claim 15 wherein the predetermined dimension is at least 50 mm.
17. The method according to clause 16 wherein the predetermined dimension is from 60 mm to 90 mm.
18. The method according to clause 17 wherein the predetermined dimension is from 70 mm to 80 mm.
19. The method according to any one of clauses 14 to 18 wherein cutting steps d and e are carried out substantially simultaneously.
20. The method according to any one of clauses 14 to 19 wherein cutting step e cuts the slice into only two slice portions.
21. The method according to any one of clauses 14 to 20 wherein the plurality of potatoes provided in step a has a median potato diameter and the predetermined distance is greater than the median potato diameter so that at least 50% of the slices produced after cutting steps d and e are uncut.
22. The method according to clause 21 wherein the predetermined distance is greater than the median potato diameter so that at least 60% of the slices produced after cutting steps d and e are uncut.
23. The method of any one of clause 14 to 22 wherein the cutting head is an annular-shaped cutting head and a central impeller is coaxially mounted for rotation within the cutting head for delivering potatoes radially outwardly toward the cutting head.
24. The method of clause 23 wherein the impeller has a base with an upper surface across which potatoes are, in use, delivered to the cutting head, and the knives are serially mounted annularly around the cutting head.
25. The method of clause 24 wherein each first cutting edge extends substantially vertically and is spaced from the cutting head to provide a gap, extending in a radial direction, between the first cutting edge and the cutting head, each second cutting edge extending substantially horizontally and extending radially at least partly across the gap.
26. The method of clause 25 wherein each second cutting edge is located at least 50 mm above the upper surface of the impeller to define a cutting zone for cutting a single potato slice between the upper surface of the impeller and the second cutting edge.
27. A method of manufacturing potato chips, the method comprising the steps of:
  f. providing a plurality of potato slices produced by the method of any one of clauses 14 to 26;
  g. cooking and seasoning the potato slices to produce flavored potato chips; and
  h. filling a measured amount of the potato chips into a package, wherein during the filling step the package has an opening presenting a maximum width dimension, and the potato chips have a maximum width which is no more than 90% of the maximum width dimension of the opening.
28. The method according to clause 23 wherein the potato chips have a maximum width which is no more than 80% of the maximum width dimension of the opening.
29. A method of manufacturing potato chips, the method including the steps of:
  i. providing a plurality of uncut potatoes which have been graded to provide a potato diameter distribution having a median potato diameter;
  j. feeding the uncut potatoes to a cutting head adapted to cut the potatoes into slices;
  k. in the cutting head cutting each potato into a plurality of slices; and
  l. in the cutting head cutting each slice having a width greater than at least the median potato diameter into first and second slice portions so that at least 50% of the slices produced after cutting steps c and d are uncut.
30. The method according to clause 29 wherein cutting steps c and d are carried out so that at least 60% of the slices produced after cutting steps c and d are uncut.
31. The method according to clause 29 or claim 30 wherein in cutting step d each slice having a width greater than 70 mm is cut into first and second slice portions.
32. The method according to clause 31 wherein in cutting step d each slice having a width greater than 60 mm is cut into first and second slice portions.
33. The method according to clause 32 wherein in cutting step d each slice having a width greater than 50 mm is cut into first and second slice portions.
34. The method according to any one of clauses 29 to 33 wherein cutting steps c and d are carried out substantially simultaneously.
35. The method according to any one of clause 29 to 34 wherein cutting step d cuts the slice into only two slice portions.
36. The method of any one of clause 29 to 35 wherein the cutting head is an annular-shaped cutting head and a central impeller is coaxially mounted for rotation within the cutting head for delivering potatoes radially outwardly toward the cutting head.

37. The method of clause 36 wherein the impeller has a base with an upper surface across which potatoes are, in use, delivered to the cutting head.
38. The method of clauses 36 or 37 wherein the cutting head has a plurality of knives serially mounted annularly around the cutting head, each knife having a first cutting edge cutting the slices in step c and a second cutting edge cutting the slices in step d.
39. The method of clause 38 wherein each first cutting edge extends substantially vertically and is spaced from the cutting head to provide a gap, extending in a radial direction, between the first cutting edge and the cutting head, each second cutting edge extending substantially horizontally and extending radially at least partly across the gap.
40. The method of clause 39 wherein each second cutting edge is located at least 50 mm above the upper surface of the impeller to define a cutting zone for cutting a single potato slice between the upper surface of the impeller and the second cutting edge.
41. The method according to any one of clauses 29 to 40, the method further comprising the step of:
    e. cooking and seasoning the potato slices from cutting steps c and d to produce flavored potato chips; and
    f. filling a measured amount of the potato chips into a package, wherein during the filling step the package has an opening presenting a maximum width dimension, and the potato chips have a maximum width which is no more than 90% of the maximum width dimension of the opening.
42. The method according to clause 41 wherein the potato chips have a maximum width which is no more than 80% of the maximum width dimension of the opening.
43. A blade clamp for use in a potato slicing apparatus, the blade clamp comprising:
    a cutting head;
    a blade mount slidingly engaged with the cutting head;
    a first knife element between the cutting head and the blade mount, the first knife element having a first cutting edge; and
    optionally, a second knife element having a second cutting edge, the second knife element extending through a slot in the blade mount, such that the first and second cutting edges are substantially orthogonal to each other.
44. The blade clamp of clause 43, wherein the cutting head, blade mount and first knife element are coplanar.
45. The blade clamp of any of clauses 43 and 44, wherein the cutting head further comprises a nub to engage with a hole in the knife element to register the first cutting edge with the cutting head.
46. The blade clamp of any of the foregoing clauses, wherein the cutting head further comprises an elongate trough extending along a rear side thereof
47. The blade clamp of clause 46, further comprising a rocking arm having a lever-handle, and an elongate portion configured to fit within the elongate trough of the cutting head.
48. The blade clamp of clause 47, wherein the elongate portion of the rocking arm is substantially cylindrical and includes a flat region extending at least partially along a length thereof, the flat region facing a surface of the blade mount, when the clamp is in use.
49. The blade clamp of clause 48, wherein motion of the lever-handle of the rocking arm causes rotation of the elongate portion thereof in the trough thereby allowing sliding disengagement of the blade mount from the cutting head to allow removal and replacement of the first knife element between the cutting head and the blade mount, without removing the blade clamp from the slicing apparatus.
50. The blade clamp of any of the forgoing clauses, wherein the blade mount comprises a bull nose, the bull nose angled and having a leading edge, the leading edge abutting tightly against the first knife element, when the clamp is in use.
51. The blade clamp of clause 50, wherein the bull nose of the blade mount comprises a slot, and the second cutting edge extends through the slot in the bull nose, the second cutting edge oriented orthogonally to the first cutting edge.
52. The blade clamp of clause 51, wherein motion of the lever-handle of the rocking arm causes rotation of the elongate portion thereof in the trough thereby allowing sliding disengagement of the blade mount from the cutting head to allow removal and replacement of either the first knife element or the second knife element, or both, without removing the blade clamp from the slicing apparatus.
53. The blade clamp of clause 52, wherein the second knife element includes a handle portion, the handle portion extending rearward beyond a bull nose portion of the blade mount, the handle portion clamped between the blade mount and the first knife element.
54. The blade clamp of clause 43, further comprising a fastener affixed to the cutting head at one end thereof, and a head of the fastener at another end thereof slidingly engages a slot of the blade mount, and wherein rotation of the rocking arm in a first direction locks the blade mount to the cutting head, and rotation in an opposite direction permits disengagement of the blade mount from the cutting head, without removing the blade clamp from the slicing apparatus.
55. A blade clamp for use in a potato slicing apparatus, the blade clamp comprising:
    a cutting head, the cutting head having a longitudinally-extending trough along a rear portion thereof;
    a blade mount slidingly engaged with the cutting head;
    a first knife element sandwiched between the cutting head and the blade mount, the first knife element having a first cutting edge; and
    a rocking arm, the rocking arm having a lever-handle and an elongate substantially cylindrical portion, the elongate portion having a flat region along one side thereof, the elongate portion sized and configured to fit within the trough of the cutting head such that the flat region faces an underside of the blade mount.
56. The blade clamp of clause 55, wherein the cutting head further comprises a nub to engage with a hole in the knife element to register the first cutting edge with the cutting head.
57. The blade clamp of clauses 55 or 56, wherein the blade mount comprises a bull nose, the bull nose angled and having a leading edge, the leading edge abutting tightly against the first knife element, when the clamp is in use.
58. The blade clamp of clauses 55-57, wherein the blade mount comprises a slot to engage a fastener, the fastener extending through the blade mount into the cutting head.
59. The blade clamp of any of the forgoing clauses, wherein the blade mount further comprises a bull nose, the bull nose angled having a slot, a cutting edge of a second knife extending from the slot, the cutting edge of the second knife element oriented orthogonally to the cutting edge of the first knife element.

60. The blade clamp of clause 59, wherein movement of the rocking arm permits sliding disengagement of the blade mount from the cutting head allowing access to remove and replace the first knife element, or the second knife element or both.

61. The blade clamp of any of clauses 55-60, wherein movement of the rocking arm in a first direction locks the blade mount to the cutting head, and movement in an opposite diction permits sliding disengagement of the blade mount from the cutting head thereby allowing access to remove and replace the first knife element, without removing the blade clamp from the slicing apparatus.

62. A blade clamp for use in a potato slicing apparatus, the blade clamp comprising:
  - a cutting head, the cutting head having a longitudinally-extending trough along a rear portion thereof;
  - a blade mount having a bull nose portion that includes a laterally-extending slot therein, and the blade mount having a slot receiving a fastener, the fastener extending to the cutting head;
  - a first knife element sandwiched between the cutting head and the blade mount, the first knife element having a first cutting edge;
  - optionally, a second knife element having a second knife edge, the second knife element extending from the at least one slot of the blade mount, such that the first and second cutting edges are substantially orthogonal to each other, the second knife element including a handle portion, the handle portion extending rearward beyond the bull nose portion of the blade mount, the handle portion clamped between the blade mount and the first knife element; and
  - a rocking arm, the rocking arm substantially L-shaped and having a lever-handle and an elongate substantially cylindrical portion, the elongate portion having a flat region along one side thereof, the elongate portion sized and configured to fit within the trough of the cutting head such that the flat region faces an underside of the blade mount;
  - wherein rotation of the rocking arm in a first direction clamps the blade mount to the cutting head and rotation of the rocking arm in an opposite direction permits removal of the first knife element and option second knife element, without removing the blade clamp from the slicing apparatus.

What is claimed is:

1. A blade clamp for use in a potato slicing apparatus, the blade clamp comprising:
  - a cutting head comprising a cutting head body having a leading edge;
  - a blade mount slidingly engaged with the cutting head, the blade mount comprising a planar region and a bull nose portion, the bull nose portion having a slot configured to receive a knife element;
  - a first knife element between the cutting head and the blade mount, the first knife element having a first cutting edge aligned with the leading edge of the cutting head body; and
  - a second knife element having a second cutting edge, the second knife element having a handle portion extending rearward beyond the bull nose portion of the blade mount and under the planar portion of the blade mount, the cutting edge of the second knife element extending through the slot in the blade mount, such that the first and second cutting edges are substantially orthogonal to each other.

2. The blade clamp of claim 1, wherein the cutting head further comprises a nub to engage with a hole in the knife element to register the first cutting edge with the cutting head.

3. The blade clamp of claim 1, wherein the cutting head further comprises an elongate trough extending along a rear side thereof.

4. The blade clamp of claim 3, further comprising a rocking arm having a lever-handle, and an elongate portion configured to fit within the elongate trough of the cutting head.

5. The blade clamp of claim 4, wherein the elongate portion of the rocking arm is substantially cylindrical and includes a flat region extending at least partially along a length thereof, the flat region facing a surface of the blade mount, when the clamp is in use.

6. The blade clamp of claim 5, wherein motion of the lever-handle of the rocking arm causes rotation of the elongate portion thereof in the trough thereby allowing sliding disengagement of the blade mount from the cutting head to allow removal and replacement of the first knife element between the cutting head and the blade mount, without removing the blade clamp from the slicing apparatus.

7. The blade clamp of claim 4, wherein motion of the lever-handle of the rocking arm causes rotation of the elongate portion thereof in the trough thereby allowing sliding disengagement of the blade mount from the cutting head to allow removal and replacement of either the first knife element or the second knife element, or both, without removing the blade clamp from the slicing apparatus.

8. The blade clamp of claim 1, further comprising a fastener having a first end and a second end, the first end of the fastener affixed to the cutting head and the second end of the fastener slidingly engaging a slot of the blade mount, and wherein rotation of the rocking arm in a first direction locks the blade mount to the cutting head, and rotation in an opposite direction permits sliding disengagement of the blade mount from the cutting head, without removing the blade clamp from the slicing apparatus using tools.

9. A blade clamp for use in a potato slicing apparatus, the blade clamp comprising:
  - a cutting head, the cutting head having a longitudinally-extending trough along a rear portion thereof;
  - a blade mount slidingly engaged with the cutting head, the blade mount comprising a planar portion and a bull nose portion, the bull nose portion having a slot configured to receive a knife element;
  - a first knife element sandwiched between the cutting head and the blade mount, the first knife element having a first cutting edge;
  - a second knife element having a second cutting edge, the second knife element having a handle portion extending rearward beyond the bull nose portion of the blade mount and under the planar portion of the blade mount, the cutting edge of the second knife element extending through the slot in the blade mount, such that the first and second cutting edges are substantially orthogonal to each other; and
  - a rocking arm, the rocking arm having a lever-handle and an elongate substantially cylindrical portion, the elongate portion having a flat region along one side thereof, the elongate portion sized and configured to fit within the trough of the cutting head such that the flat region faces an underside of the blade mount
  - wherein movement of the rocking arm in a first direction locks the blade mount to the cutting head, and movement in an opposite direction permits sliding disengagement of the blade mount from the cutting head thereby allowing access to remove and replace the first knife element and the second knife element, without removing the blade clamp from the slicing apparatus.

10. The blade clamp of claim 9, wherein the cutting head further comprises a nub to engage with a hole in the knife element to register the first cutting edge with the cutting head.

11. The blade clamp of claim 9, wherein the bull nose portion is angled and has a leading edge, the leading edge abutting tightly against the first knife element, when the clamp is in use.

12. The blade clamp of claim 9, wherein the blade mount comprises a slot to engage a fastener, the fastener extending through the blade mount into the cutting head.

13. The blade clamp of claim 9, wherein movement of the rocking arm permits sliding disengagement of the blade mount from the cutting head allowing access to remove and replace the first knife element, or the second knife element or both.

14. A blade clamp for use in a potato slicing apparatus, the blade clamp comprising:

a cutting head, the cutting head having a longitudinally-extending trough along a rear portion thereof;

a blade mount having a bull nose portion that includes a laterally-extending slot therein, and the blade mount having a slot receiving a fastener, the fastener extending to the cutting head;

a first knife element sandwiched between the cutting head and the blade mount, the first knife element having a first cutting edge;

a second knife element having a second knife edge, the second knife element extending from the laterally-extending slot of the blade mount, such that the first and second cutting edges are substantially orthogonal to each other, the second knife element including a handle portion, the handle portion extending rearward beyond the bull nose portion of the blade mount, the handle portion clamped between the blade mount and the first knife element; and a rocking arm, the rocking arm substantially L-shaped and having a lever-handle and an elongate substantially cylindrical portion, the elongate portion having a flat region along one side thereof, the elongate portion sized and configured to fit within the trough of the cutting head such that the flat region faces an underside of the blade mount;

wherein rotation of the rocking arm in a first direction clamps the blade mount to the cutting head and rotation of the rocking arm in an opposite direction permits removal of the first knife element and the second knife element, without removing the blade clamp from the slicing apparatus.

* * * * *